Patented Sept. 8, 1936

2,053,308

UNITED STATES PATENT OFFICE 2,053,308

VAT DYES OF THE DIBENZANTHRONE SERIES

Alexander John Wuertz, Wilmington, Del., assignor to E. I. du Pont de Nemours & Company, Wilmington, Del., a corporation of Delaware No Drawing. Application February 12, 1931, Serial No. 515,407

16 Claims. (Cl. 260—61)

This invention relates to derivatives of anthraquinone. More particularly it relates to vat dyes produced from dibenzanthrone (violanthrone) derivatives. Specifically it contemplates the oxidation products of the mono-ketonic derivatives of dibenzanthrone.

Applicant has previously shown that it is possible to produce mono-ketonic derivatives of dibenzanthrone. By the expression "mono-ketonic derivative" is meant a derivative in which the dibenzanthrone nucleus (it is believed that the nucleus remains intact during the process) is attached to one other nucleus (thereby being a "mono derivative") by means of one or more "ketonic" linkages. Representative compounds of this series found in applicant's prior disclosures are as follows:

(No. 1)

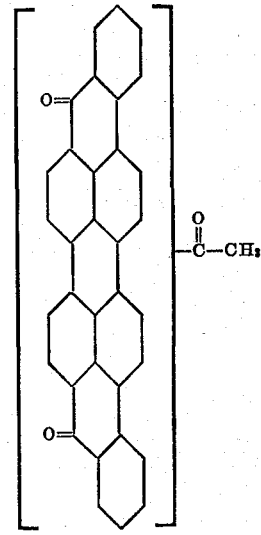

(U. S. patent application 475,625, August 15, 1930)

(No. 2)

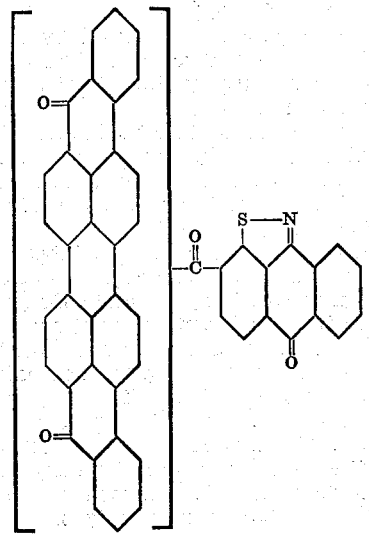

(U. S. patent application 475,626, August 15, 1930)

(No. 3)

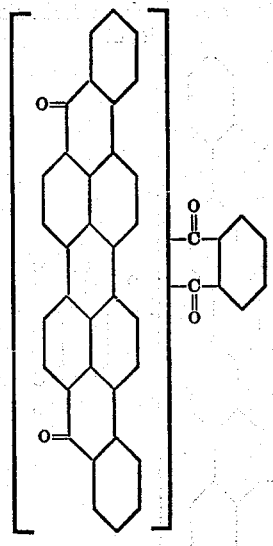

(U. S. application 475,627, August 15, 1930)

That such a series of compounds could be produced was surprising in view of the work of Kranzlein and Sedylmayr (U. S. Patent 1,736,084 of Nov. 19, 1929) from which it appeared that only di-ketonic substitution products of dibenzanthrone, such as

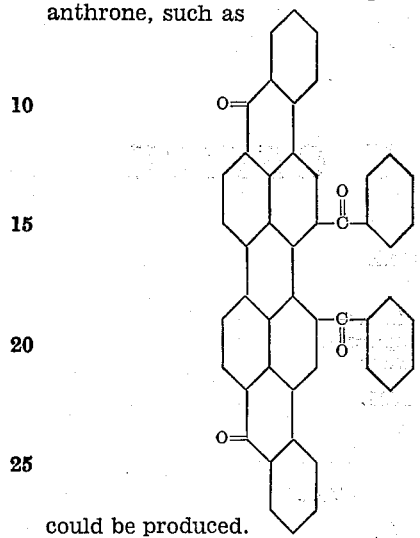

could be produced.

The new compounds produced by applicant, that is, the mono-ketonic derivatives of dibenzanthrone are vat dyes producing blue shades of excellent properties on cotton.

It has now been found that these new dyes can be converted by oxidation to products which are also vat dyes. These new products resulting from the oxidation produce green dyeings of very desirable properties.

This invention has as objects, inter alia, the production of new chemical compounds, the production of new dyes, the production of new dibenzathrone derivatives, the provision of new chemical processes and in general an advancement of the art. Other objects will appear hereinafter.

These objects are accomplished by oxidizing mono-ketonic derivatives of dibenzanthrone and where desirable, stabilizing the resulting oxygroups. The invention will be further understood from a consideration of the following examples in which the parts are given by weight.

*Example I*

One hundred (100) parts of the condensation product having the probable formula
(No. 4)

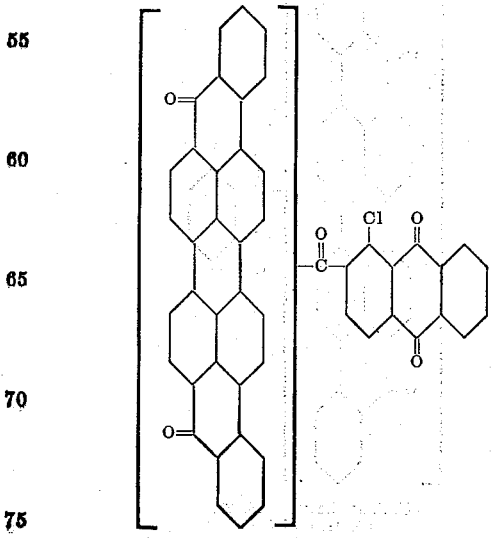

were dissolved in 1000–1500 parts of 95–100% sulphuric acid at 80–100° C. After a complete solution had taken place the temperature was brought down to 20–25° C. then while agitating well, 100–120 parts of technical (the pure compound may be used with satisfactory results) manganese dioxide were fed into the solution at such a rate as not to allow the temperature to rise over 35–40° C. When the addition was complete the mass was agitated at room temperature for 1–3 hours. The resultant mass was then poured into ice water (cold water may be used if desired) and diluted to approximately 5–8% acidity.

To this suspension which contained an excess of manganese dioxide was added 100–150 parts of sodium bisulphite and the whole boiled for about 1–2 hours. The sodium bisulphite rendered the excess of manganese dioxide water soluble and at the same time converted the oxidized dyestuff to its enolic form, the original oxidation product being in the keto form. The precipitate was then separated by filtration and washed acid free. Thereafter the greenish-blue residual cake was suspended in approximately 1500–2000 parts of water containing 50–75 parts of solid caustic soda. The alkaline suspension was vigorously stirred to break up the lumps and the dyestuff was subsequently reduced with 40–50 parts of sodium hydrosulphite at 60–70° C. The reduction took place almost instantaneously. After one-half hour of agitation at the indicated temperature precipitation set in and within two hours the sodium salt of the enolic form of the green dyestuff completely separated in a uniform crystalline form. This precipitate was then separated by filtration and washed with hot water until free of alkali. The product thus obtained is a greenish-black powder when dry and a green paste when wet. Its sulphuric acid solution is yellowish-red and does not change with the addition of copper powder. It is insoluble in all ordinary organic solvents. The product dyes cotton from a pure blue hydrosulphite vat in pure blue shades which when exposed to air oxidize to pure brilliant yellow green shades which are fast to soaping.

*Example II*

In the same manner as set forth in Example I, 100 parts of the condensation product having probable formula No. 2 (set out above) were treated with the same proportions of sulphuric acid and manganese dioxide as indicated in said example. The identical procedure of Example I was followed and the dyestuff formed was isolated. It is a green powder which dyes in yellower shades than the product obtained in Example I. This particular dyestuff differs from the product of Example I in that it possesses a slightly lower solubility in alkaline hydrosulphite vat. Its sulphuric acid solution is a yellower red than that of the product of Example I.

*Example III*

One hundred (100) parts of the condensation product of the probable formula (No. 5)

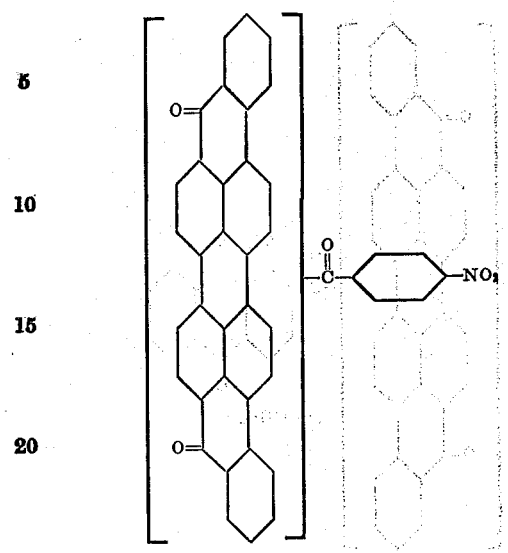

was treated in the same manner as indicated in Example I. The product obtained is a green powder having a bluish-red sulphuric acid solution. It dyes cotton in moss green shades from a dull blue hydrosulphite vat. A like product is obtained when compound No. 5 is reduced to the corresponding amine and treated similarly.

The compounds having the probable formulae, No. 1 above, No. 3 above and (No. 6)

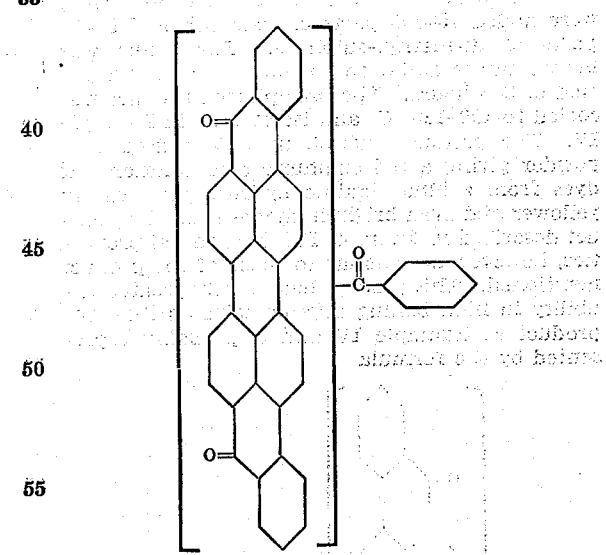

when similarly treated produce green vat dyes of very desirable properties.

The dyestuffs previously described are similar in character although some minor differences in behavior exist, as for example, in the conditions of application and the solubility in an alkaline hydrosulphite vat. These minor differences in properties would naturally be expected because of the difference in chemical constitution. In the above described procedure the quantities of acids used may be 10–20 parts greater, the amount of manganese dioxide may be less than indicated. Any more than the maximum amount specified would be superfluous. Any excess of manganese dioxide remains inert. The temperature range may vary from 0–50° C. In the oxidation step the time factor may be increased to 10 hours. At room temperature no harm is incurred by continued treatment after the oxidation is complete.

The structure of the new compounds is probably represented by the following formulae:

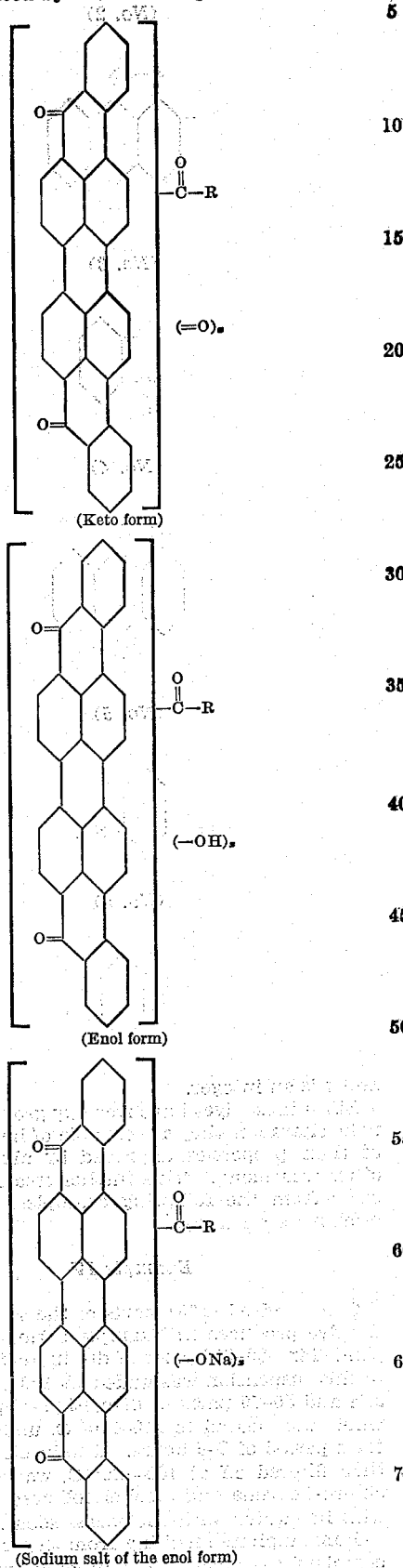

Wherein R represents one of the groups (No. 1)

—CH₃

(No. 2)

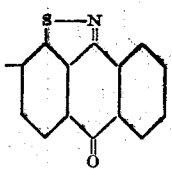

(No. 3)

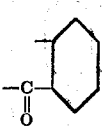

(No. 4)

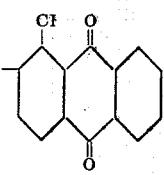

(No. 5)

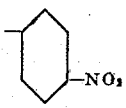

(No. 6)

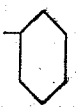

and $x$ is an integer.

Since these dyes have free oxy groups of a phenolic character they are capable of having certain of their properties improved by alkylation and other treatments. This further treatment will be clear from the following examples, in which $x$ represents an integer.

*Example IV*

One hundred (100) parts of the sodium salt of the dye produced in Example I, No. 4, were suspended in 600–800 parts of di-chloro-benzene and to this suspension was added 75–100 parts of soda ash and 50–75 parts of di-methyl-sulphate. The whole was heated to 140–170° C. under agitation for a period of 3–6 hours. The insoluble dye was then filtered off at 100–120° C. washed with di-chloro-benzene and alcohol followed by washing with hot water until the excess soda ash and the sodium sulphate resulting from the reaction were completely removed. The product thus obtained is a bluish powder giving a yellow-red sulphuric acid solution and probably has the following formula

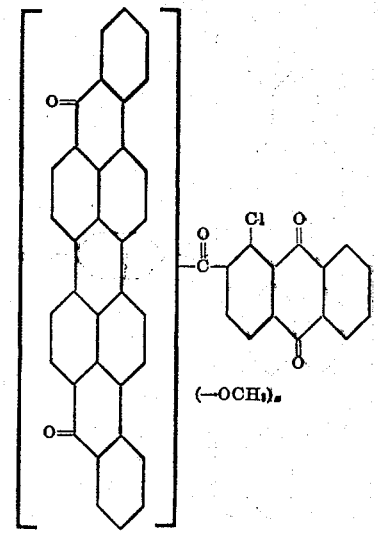

It dyes in yellow-green shades from a deep blue alkaline hydrosulphite vat. In a paste form it is suitable for printing on cotton. It dyes from a cold and warm hydrosulphite bath alone and in combination with other vat dyes. It dyes rayon from a weak alkaline hydrosulphite vat.

*Example V*

One hundred (100) parts of the oxidation product of compound No. 6 were suspended in 600–800 parts of di-chloro-benzene. To this suspension were added 75–100 parts of soda ash and 50–75 parts of di-methyl-sulphate. The whole was heated under agitation to 140–170° C. for a period of 3–6 hours. The precipitated product was cooled to 100–120° C. and isolated as in Example IV. The product thus obtained is a dark blue powder giving a red sulphuric acid solution. It dyes from a blue alkaline hydrosulphite vat in yellower and even brighter shades than the product described in Example IV. Its general properties, however, are similar to those of the product mentioned. This product has slightly greater solubility in high boiling organic solvents than the product of Example IV and is probably represented by the formula

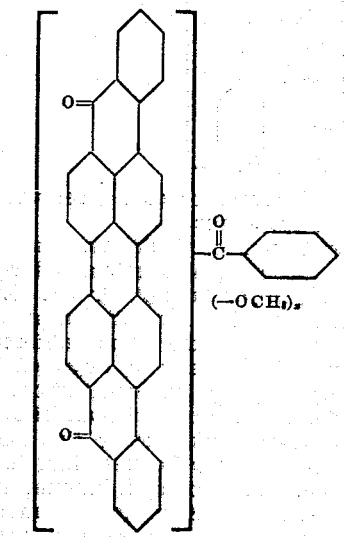

*Example VI*

The procedure of Examples IV and V was carried out using the sodium salt of the oxy compound of the dibenzanthrone derivative No. 1 set out above. The general behavior of the resultant dye is somewhat similar to the dyes of Examples IV and V. It dyes from an alkaline hydrosulphite vat in excellent green-yellow shades. Its formula is probably as follows:

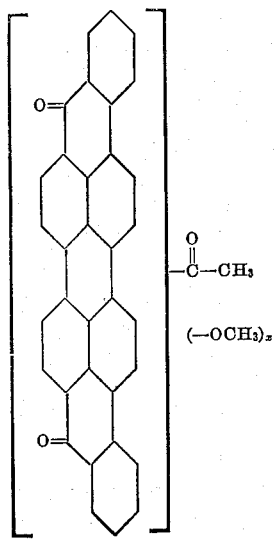

*Example VII*

One hundred (100) parts of the sodium salt of the product of Example III were suspended in 600-800 parts of di-chloro-benzene and thereafter 75-100 parts of soda ash and 50-75 parts of di-methyl-sulphate added. The whole was then heated under agitation to 140-160° C. for a period of 3-4 hours. The resultant dye was soluble in the reaction mass so that it was necessary to cool the reaction mass to 80-90° C. and then dilute with 300-400 parts of ethyl (methyl is also suitable) alcohol in order to precipitate it. It was then filtered off, washed and isolated as indicated in Examples IV, V and VI.

The product thus obtained is a black to a greenish-black powder. It gives a bluish-red sulphuric acid solution and dyes from a reddish-blue vat in deep olive green shades of excellent fastness. This product possesses excellent covering power. It probably has an amino- or methyl-amino-group in the para position, the nitro (NO$_2$) group having undergone reduction in alkaline hydrosulphite treatment. The formula of this compound is not definitely known but is probably one of the two following:

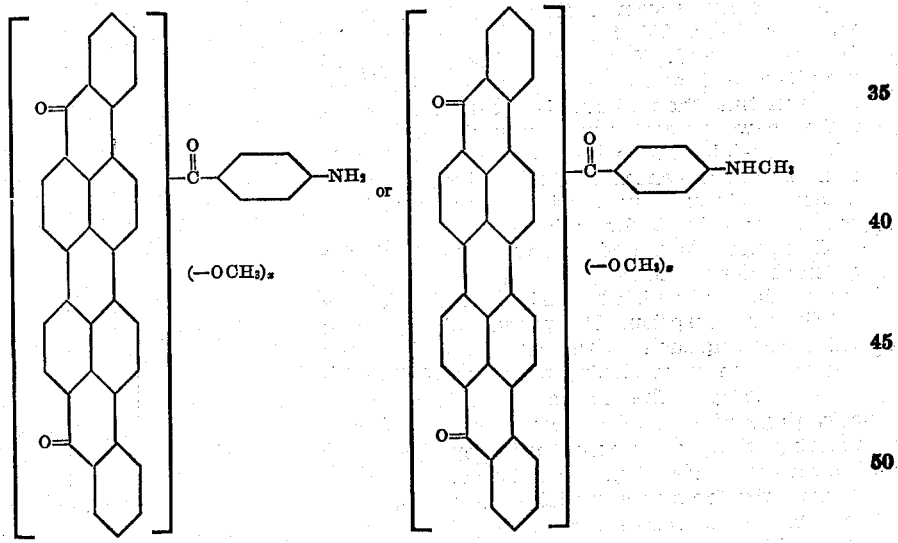

In a similar manner dyes may be obtained from the dye of Example III and the oxy compound of compound No. 3 above described. These dyes generally resemble the dyes of the above specific examples and are probably represented by the formulae.

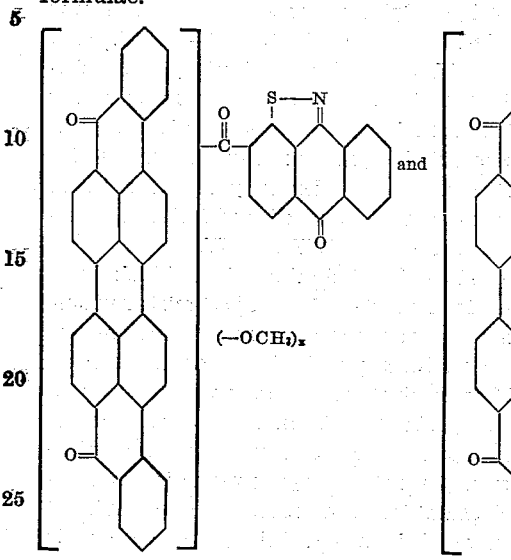

The above alkylations may be effected in a medium of xylene or solvent naphtha as well as mono-chloro-, tri-chloro-benzenes, nitro benzene and other inert solvents. The temperature limits may vary from 100° C. up to the boiling point of the solvents used. The ratios of the solvents used may be as high as 10 parts and as low as 4 parts. A longer time than 6 hours is not detrimental.

The new oxy-compounds may also be heated with para-toluidine in the presence of boric acid and tri-chloro benzene. Such a treatment increases their brilliance and also enhances their fastness to acids and alkalies.

These new compounds are vat dyes which dye green shades of excellent fastness. They thereby meet a demand which has existed in the vat dye art since its inception. The production of a green vat dye having such desirable properties has been one of the most perplexing problems of the dyestuff industry. The new compounds have the advantage of a covering power in dyeing and printing that is greater than any previously known derivative of dibenzanthrone.

From the facts now available the formulae set out above appear to be correct. It will be appreciated, however, that applicant does not desire to limit the application to any particular formula or formulae but only to the invention described.

As many apparently widely different embodiments of this invention may be made without departing from the spirit and scope thereof, it is to be understood that I do not limit myself to the specific embodiments thereof except as defined in the appended claims.

I claim:

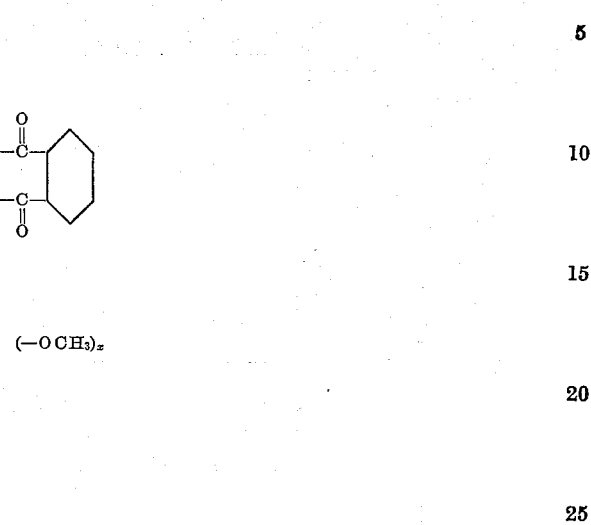

1. The vat dye probably having the following formula

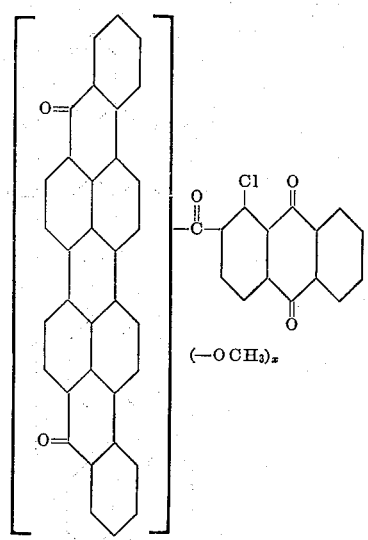

$x$ being an integer, which is a bluish powder, giving a yellow-red sulphuric acid solution and a deep blue alkaline hydrosulphite vat from which it dyes cotton in yellow-green shades and which may be produced by oxidizing, mildly reducing and alkylating the product obtained by condensing one molecular proportion of 1-chloro-anthraquinone-2-carbonyl chloride with violanthrone.

2. The vat dye probably having one of the following formulae

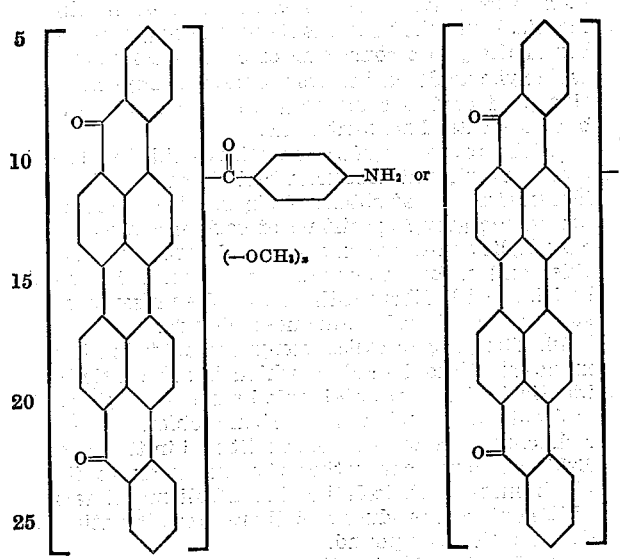

$x$ being an integer, which is a black to greenish-black powder, giving a bluish-red sulphuric acid solution and a reddish-blue alkaline hydrosulphite vat from which it dyes cotton in olive green shades and which is obtainable by oxidizing, mildly reducing and methylating the product obtainable by condensing one molecular proportion of para-nitro-benzoyl chloride with violanthrone.

3. The vat dye probably having the following formula

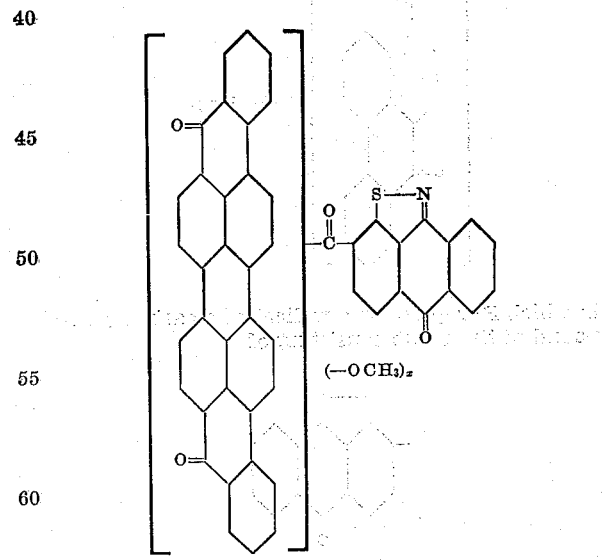

$x$ being an integer, which is a black to greenish black powder, giving a bluish-red sulphuric acid solution and a reddish-blue alkaline hydrosulphite vat from which it dyes cotton in olive green shades and which is obtainable by oxidizing, reducing and methylating the product which may be obtained by condensing one molecular proportion of 1:9-anthrathiazole-2-carbonyl chloride with violanthrone.

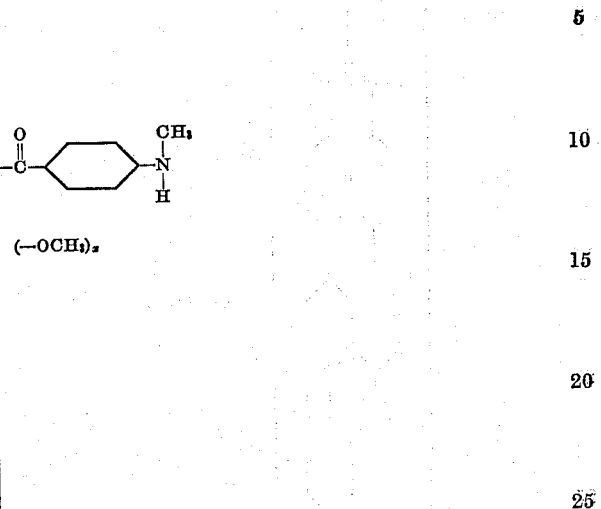

4. The dyes probably having the following formula

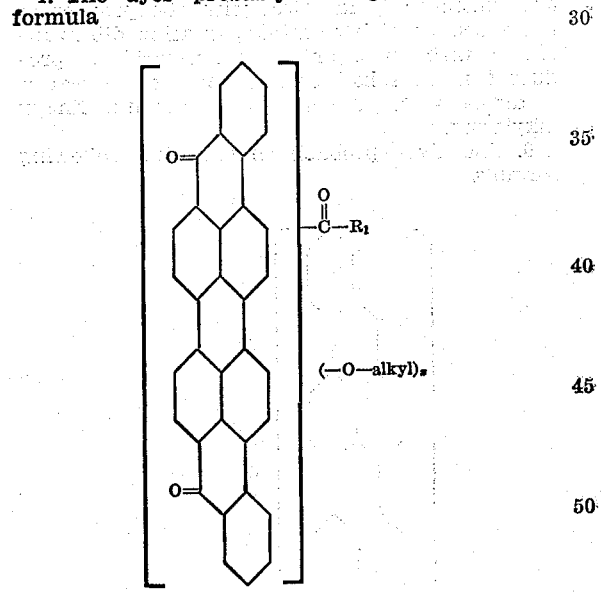

in which $R_1$ represents a radical of a carbon compound and $x$ is an integer and which dyes are substantially identical with the product obtainable by treating dibenzanthrone with an organic acid chloride to produce a mono-substitution compound thereafter oxidizing with manganese dioxide and finally alkylating.

5. The dyes probably having the following formula

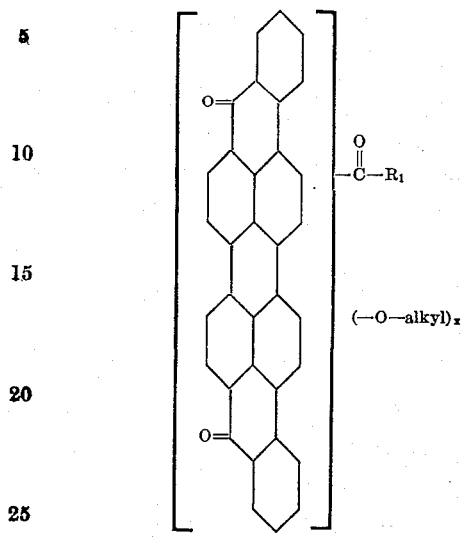

in which $R_1$ represents a radical of a carbon compound and $x$ an integer and which dyes are substantially identical with the product of the process which comprises treating dibenzanthrone with an organic acid anhydride to produce a mono-substitution compound, thereafter oxidizing with manganese dioxide and finally alkylating.

6. The dyes probably having the following formula

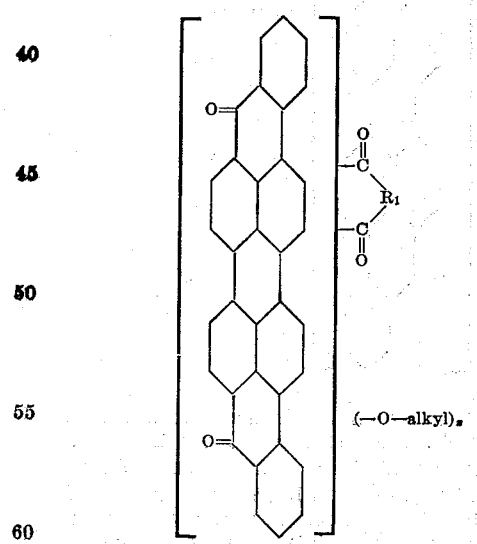

in which $R_1$ represents a radical of a carbon compound and $x$ an integer and which dyes are substantially identical with the product of the process which comprises treating dibenzanthrone with the anhydride of an aryl dicarboxylic acid to produce a mono-substitution compound, thereafter oxidizing with manganese dioxide and finally alkylating.

7. The process which comprises oxidizing the product which is substantially identical with that obtainable by reacting a member of the group consisting of carbon compound carboxylic acids, carbon compound carbonyl chlorides and carbon compound carboxylic acid anhydrides with dibenzanthrone in the presence of aluminum chloride.

8. The process which comprises oxidizing the mono substituted product which is substantially identical with that obtainable by reacting a member of the group consisting of carbon compound carboxylic acids, carbon compound carbonyl chlorides and carbon compound carboxylic acid anhydrides with dibenzanthrone.

9. The process which comprises oxidizing the mono substituted product which is substantially identical with that obtainable by reacting a member of the group consisting of carbon compound carboxylic acids, carbon compound carbonyl chlorides and carbon compound carboxylic acid anhydrides with dibenzanthrone in the presence of sulphuric acid and manganese dioxide.

10. The process which comprises oxidizing the mono-substituted product which is substantially identical with that obtainable by condensing one molecular proportion of a carbonyl chloride with a dibenzanthrone being unsubstituted in the Bz2, Bz2' positions, converting the oxy body to its alkali metal salt, isolating the alkali metal salt of the oxidized product and thereafter alkylating the resulting compound.

11. The dyes having the formula

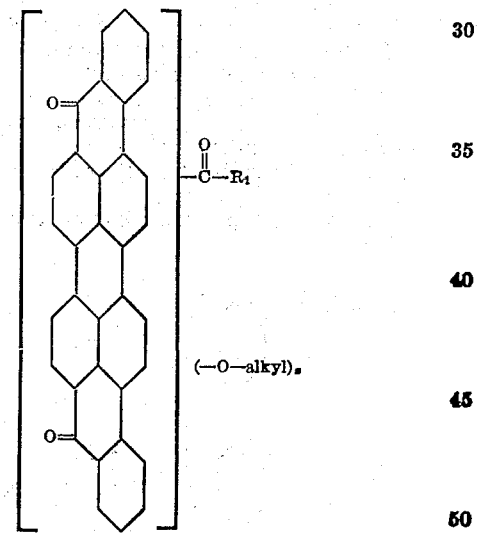

in which $R_1$ represents a radical of a carbon compound of the group consisting of

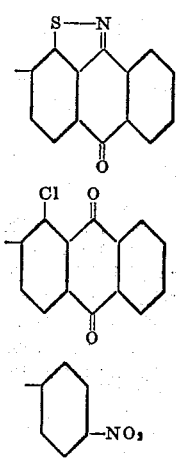

and $x$ is an integer.

12. The dyes probably having the following formula

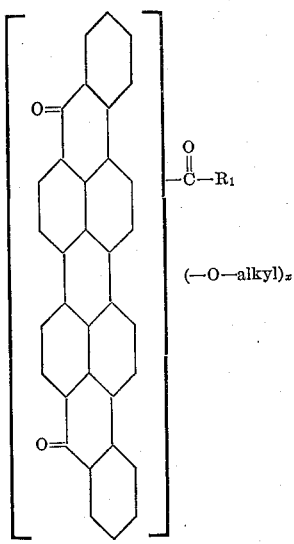

in which $R_1$ represents a radical of a carbon compound and $x$ an integer and which dyes are substantially identical with the product of the process which comprises treating dibenzanthrone with an organic acid anhydride to produce a mono-substitution compound and thereafter oxidizing with manganese dioxide.

13. The dyes having the formula $$Q(-O-alkyl)_x$$

in which Q represents the nucleus of the product obtainable by condensing one molecular proportion of a carbonyl halide with violanthrone, $x$ is an integer and which dyes are obtainable by treating the products represented by Q with a carbonyl halide, oxidizing with manganese dioxide and finally alkylating.

14. The products having the formula $$(Q(-OH)_x$$

in which Q represents the nucleus of the product obtainable by condensing one molecular proportion of a carbonyl halide with violanthrone, $x$ is an integer, and which dyes are obtainable by treating the products represented by Q with a carbonyl halide, oxidizing with manganese dioxide and mildly reducing.

15. The process which comprises oxidizing with manganese dioxide and thereafter alkylating the product obtainable by condensing one molecular proportion of a carbonyl halide with a dibenzanthrone which is unsubstituted in the Bz2, Bz2' position.

16. The process which comprises oxidizing with manganese dioxide and thereafter methylating the product obtainable by condensing one molecular proportion of a carbonyl halide with a dibenzanthrone which is unsubstituted in the Bz2, Bz2' position.

ALEXANDER J. WUERTZ.

CERTIFICATE OF CORRECTION.

Patent No. 2,053,308. September 8, 1936.

ALEXANDER JOHN WUERTZ.

It is hereby certified that error appears in the printed specification of the above numbered patent requiring correction as follows: Page 9, second column, line 11, claim 14, in the formula, before "Q" strike out the parenthesis; and that the said Letters Patent should be read with this correction therein that the same may conform to the record of the case in the Patent Office.

Signed and sealed this 8th day of December, A. D. 1936.

(Seal)

Henry Van Arsdale
Acting Commissioner of Patents.